(12) United States Patent
Rackham

(10) Patent No.: US 6,939,430 B2
(45) Date of Patent: Sep. 6, 2005

(54) METHOD OF BONDING, A BONDED STRUCTURE AND A USE OF XYLAN

(75) Inventor: Richard Alan Rackham, Spooner Row (GB)

(73) Assignee: Lotus Cars Limited (GB)

( * ) Notice: Subject to any disclaimer, the term of this patent is extended or adjusted under 35 U.S.C. 154(b) by 145 days.

(21) Appl. No.: 10/220,937

(22) PCT Filed: Mar. 8, 2001

(86) PCT No.: PCT/GB01/01015

§ 371 (c)(1),
(2), (4) Date: Nov. 30, 2002

(87) PCT Pub. No.: WO01/66663

PCT Pub. Date: Sep. 13, 2001

(65) Prior Publication Data

US 2003/0096133 A1 May 22, 2003

(30) Foreign Application Priority Data

Mar. 8, 2000 (GB) .............................. 0005569

(51) Int. Cl.[7] .............................................. B32B 31/26
(52) U.S. Cl. ............................... 156/307.7; 156/307.3; 156/314; 428/421
(58) Field of Search ............................ 156/307.7, 314, 156/330, 307.1, 307.3, 307.5; 428/421, 422

(56) References Cited

U.S. PATENT DOCUMENTS 4,402,267 A * 9/1983 DeMoore .................... 101/419

FOREIGN PATENT DOCUMENTS

| EP | 442145 A2 * | 8/1991 | ............ H05K/1/03 |
| EP | 0902 050 | 3/1999 | |
| WO | WO 99/47615 | 9/1999 | |

OTHER PUBLICATIONS

Georg Thieme Verlag, 1992, XP002169582, P. 5084, right-hand column, paragrah Xylane (with English Translation).
International Search Report for PCT/GB01/01015.
UK Patent Office Search Report for GB 0005569.9.

* cited by examiner

Primary Examiner—Jeff H. Aftergut
Assistant Examiner—John L. Goff
(74) Attorney, Agent, or Firm—Luedeka, Neely & Graham, P.C.

(57) ABSTRACT

The present invention relates in a first aspect to (with reference to FIG. 1) a method of bonding together first (10) and second (12) components with an adhesive (13) in which Xylan (11) is applied to a surface of at least one (10) of the components (10, 12) and then the adhesive (13) is applied over the Xylan coated surface and then the adhesive (13) is used to bond the first (10) and second (12) components together with the adhesive (13) adhering to the Xylan coated surface. In a second aspect the present invention relates to a bonded structure which has at least first (10) and second (12) components bonded together with an adhesive (13) and wherein Xylan (11) is used as a surface coating on at least one (10) of the bonded components to improve the strength of the bond. In a third aspect the present invention relates to use of Xylan (11) to improve the strength of a bond between two components (10, 12) by coating a surface of at least one of the components (10, 12) with Xylan (11) prior to bonding the components (10, 12) together.

31 Claims, 1 Drawing Sheet

METHOD OF BONDING, A BONDED STRUCTURE AND A USE OF XYLAN

The present invention relates to a method of bonding, to a bonded structure and to use of Xylan.

Aluminium structures have become more popular for automobiles. It is more difficult to weld aluminium structural components together than steel structural components. Therefore bonding of the components together has been used as an alternative to welding, e.g. using an epoxy or a polyurethane adhesive. The present invention relates to a way of improving the strength of bonds.

A first aspect of the present invention relates to a method of bonding together first and second components with an adhesive in which Xylan is applied to a surface of at least one of the components and then the adhesive is used to bond the first and second components together with the adhesive adhering to the Xylan coated surface.

In a second aspect the present invention relates to a bonded structure which has at least first and second components bonded together with an adhesive and wherein Xylan is used as a surface coating on at least one of the bonded components to improve the strength of the bond.

In a third aspect the present invention relates to use of Xylan to improve the strength of a bond between two components by coating a surface of at least one of the components with Xylan prior to bonding the components together.

The applicant when building an automobile structure found it necessary to bond an aluminium component to a steel component. When aluminium and steel are brought together a potential difference is established over the junction, which can result over time with problems of corrosion. To minimise the effects of this, the applicant decided to apply a coating to a surface of the aluminium component in the region of the bond. Several coatings were tried, including a Xylan coating. Xylan provided good electrical insulation characteristics, but surprisingly also improved the strength of the bond. This was very surprising, for reasons given below.

Xylan is a Fluoropolymer coating supplied by Whitford Plastics Limited of Christleton Court, Manor Park, Runcorn, Cheshire WA7 1SU, United Kingdom (telephone No.+44 928 571000, facsimile no.+44 928 571010). Xylan is a composition comprising Polytetrafluoroethylene (PTFE) in particulate form combined with polyimide-type binders, hard fillers and pigments. It is a composite with the low friction coefficients of a fluorocarbon and the wear characteristics of the binders and fillers. Xylan was developed in 1970. Xylan can be applied by spraying or bulk deposition (including electrodeposition) techniques, over a variety of substances such as steel, aluminium alloys, magnesium zinc, lead, elastomers, most plastics and glass. Substrate preparation is limited to a solvent wash or vapour degreasing.

Xylan to date in automotive applications has been used as a coating to retard corrosion and/or reduce friction. For instance, bolts have been coated to reduce bolt nut friction and piston skirts, crankshafts, piston rods and rod bearings of an internal combustion engine have been coated to reduce frictional losses in the engine. The Xylan coating has also been used on many parts to reduce noise.

Xylan as a coating can cure at temperatures significantly lower than other fluorocarbon finishes (from ambient temperature to 420° C. as compared with 420° to 480° C.). The low temperature cure capability has enabled Xylan to be applied to elastomers and other materials which would be destroyed at high cure temperatures.

Good internal combustion engine release characteristics have also led to Xylan being sprayed on e.g. carburettor components.

In the majority of its known applications Xylan has been used because of its low friction characteristics. Therefore it is very surprising that the use of Xylan can increase bond strength.

Preferred embodiments of the present invention will now be described with reference to the accompanying drawings in which.

Figure 1:
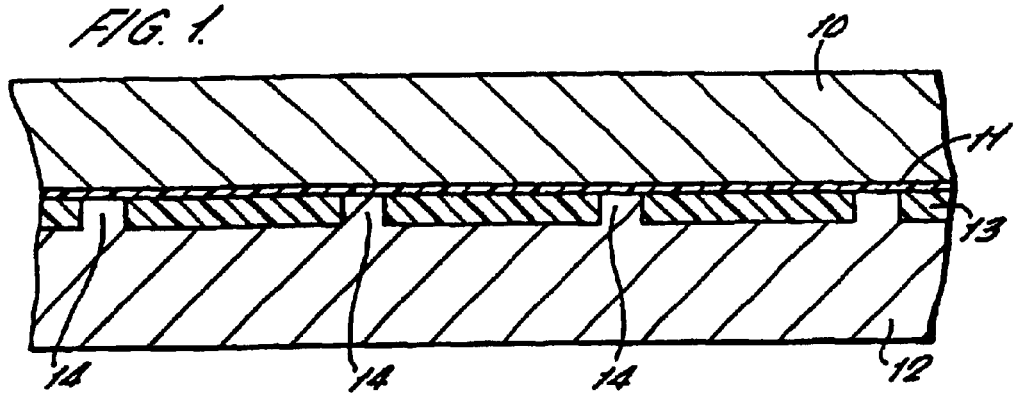
FIG. 1 is a cross-section through a first bonded joint according to the present invention between a cast aluminium component and an extruded aluminium component.

Referring to FIG. 1, the Figure is a cross section through a first bonded joint according to the present invention. A component 10 is a cast aluminium component. It is bonded to an extruded aluminium component 12. The method of bonding comprises the following steps:

(a) cleaning a portion of an exterior surface of the cast aluminium component 10 with an organic solvent;

(b) spraying the cleaned portion with a layer 11 of Xylan 1270 to a coating thickness in the range of 10 to 30 microns;

(c) curing the sprayed component in an intermediate process at 150° C. for 10 minutes;

(d) curing the sprayed component in a final cure process at 220° C. for 30 minutes;

(e) applying an epoxy adhesive 13 to the Xylan coated surface;

(f) bringing the extruded aluminium component 12 into abutment with the epoxy adhesive coated and Xylan pre-coated surface of the cast aluminium component (the aluminium component 12 has a plurality of surface ribs 14 which set the depth of epoxy adhesive);

(g) mechanically clamping the components 10 and 12 together;

(h) curing the epoxy adhesive at 190° C. for 50 minutes.

Figure 2:
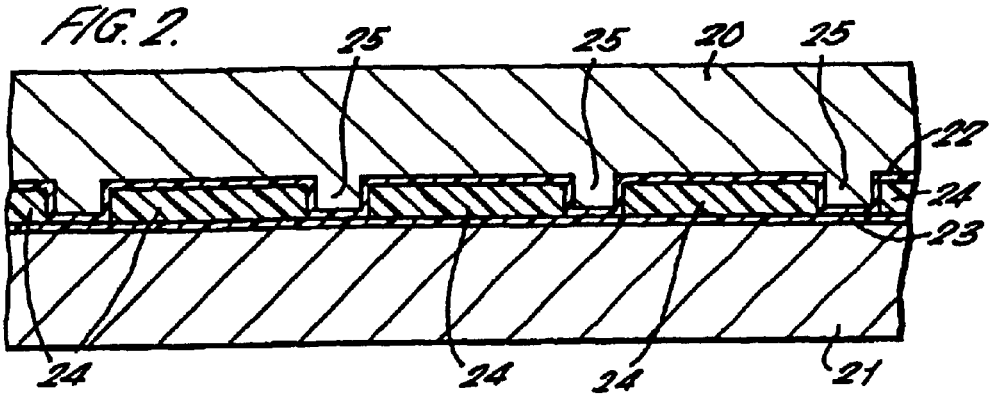
FIG. 2 is a cross-section through a second bonded joint according to the present invention between two extruded aluminium components.

Referring to FIG. 2, the Figure is a cross-section through a second bonded joint according to the present invention. An extruded aluminium component 20 is bonded to an extruded aluminium component 21. The method of bonding comprises the following steps:

(a) cleaning a portion of an exterior surface of the extruded aluminium component 20 by vapour degreasing and then grit blasting;

(b) cleaning a portion of an exterior surface of the extruded aluminium component 21 by vapour degreasing and then grit blasting;

(c) spraying the cleaned portions of the aluminium components 20 and 21 with Xylan 1270 to a coating thickness of 10 to 30 microns (a coat 22 can be seen on component 20 and a coat 23 on the component 21);

(d) arranging an intermediate cure of the Xylan coating on the components 20 and 21 at 150 C. for 15 minutes;

(e) arranging a final cure of the Xylan coating on the components 20 and 21 at 220 C. for 30 minutes;

(f) applying an epoxy adhesive 24 to one or both of the Xylan coated surfaces;

(g) bringing the extruded aluminium components 20 and 21 into abutment with each other with a plurality of ribs 25 formed during extrusion of the component 20 setting the bond depth;

(h) mechanically clamping the components 20 and 21 together;

(h) curing the epoxy adhesive at 190° C. for 50 minutes.

The components 20 and 21 can be clamped only during curing or mechanical fastenings such as EJOT screws can be used to bring together and then fasten the components 20 and 21, the fastenings remaining to aid the strength of the bond.

Figure 3:
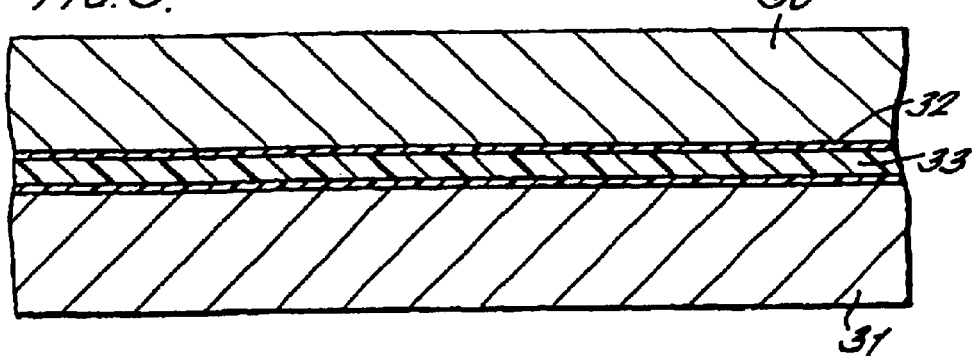
FIG. 3 is a cross-section through a third bonded joint according to the present invention between a cast aluminium component and a steel component.

Referring to FIG. 3, the Figure is a cross-section through a third bonded joint according to the present invention. A component 30 is a steel component and the component 31 is an aluminium component. They are joined together by a method of bonding comprising the following steps:

(a) cleaning a portion of an exterior surface of the steel component 30 by vapour degreasing and then grit blasting;

(b) spraying the cleaned portion with Xylan 1270 to form a coating 32 with a thickness in the range of 10 to 30 microns;

(c) curing the sprayed Xylan in an intermediate process at 150° C. for 10 minutes;

(d) curing the sprayed component in a final cure process at 220° C. for 30 minutes;

(e) applying an epoxy adhesive in a layer 33 on the Xylan coated surface 32;

(f) bringing the extruded aluminium component 31 into abutment with the layer 33 of epoxy adhesive;

(g) mechanically clamping the components 30 and 31 together;

(h curing the epoxy adhesive at 190° C. for 50 minutes.

In the formed joint the Xylan layer 32 not only improves the bond strength, but also provides corrosion protection. The applicant tested a variety of coatings with a corrosion cycle test and also with a destructive testing and the Xylan coating gave the best results both for inhibition or corrosion and also for the durability of the bond.

Figure 4:
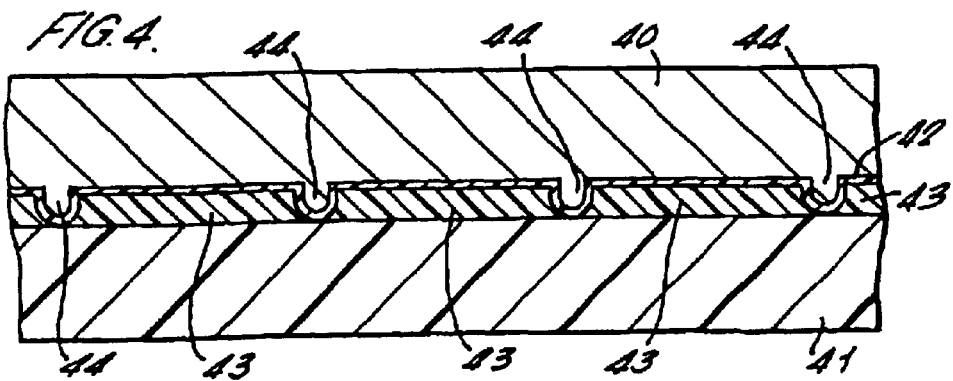
FIG. 4 is a cross-section through a fourth bonded joint according to the present invention between an extruded aluminium component and a composite component.

Referring to FIG. 4, the Figure is a cross-section through a fourth bonded joint according to the present invention. An extruded aluminium component 40 formed with a plurality of ribs 44 is bonded to a composite component 41. The method of bonding comprises the following steps:

(a) cleaning a portion of an exterior surface of the extruded aluminium component 40 with an organic solvent;

(b) spraying the cleaned portion with Xylan 1070 to form a coating 42 with a thickness in the range 10 to 30 microns;

(c) curing the sprayed component at 200° F. for 15 minutes;

(d) applying an epoxy adhesive to the Xylan coated surface in a layer 43;

(e) bringing the composite component 41 into abutment with the epoxy adhesive layer 43 and mechanically clamping the components 40 and 41 in position;

(f) curing the epoxy adhesive at 190° C. for 50 minutes.

Whilst in all of the embodiments described above the adhesive used is an epoxy adhesive, a polyurethane adhesive can also be used. Cold cure polyurethane adhesive could be used. Although the adhesive does not fully cure until seven days after bonding, the bonded joints can be de-jigged after two hours of curing at temperatures in the range 15° C. to 30° C.

Whilst in the embodiments described above the bonded components are of aluminium steel or composite (e.g. carbon fibres or glass fibres in an epoxy resin), the method can be applied to many different materials. Xylan can be successfully applied to aluminum alloys, magnesium, zinc, lead, elastomers, most plastics and glass.

Whilst in the above embodiments either an organic solvent is used to clean a surface prior to application of Xylan or vapour degreasing and then grit blasting is used, other methods are possible. For instance, phosphating could be used with phosphate deposition weights in the range 325 to 465 g/cm$^2$ (e.g. phosphates #3 and #4 from Aerocote Corporation). Primers could be used, e.g. the Xylan P-92 primer. Flash zinc plating could be used as a pretreatment before application of Xylan , with 0.2–0.3 mm of plating applied, this being etched with a modified zinc phosphate (with a 2 minute dwell) to achieve the required deposition rate and the coated with Xylan. Xylan P-5211 primer could be used with Xylan 1400 and Xylan 1424 . Xylan P-501 primer is also suitable for use with Xylan 1400 and Xylan 1424. Xylar 1 can be used as a sacrificial primer for all Xylan formulations, the Xylar 1 performing best when tolerances permit film thicknesses greater than 1 mm. Xylar 1 can be applied in coats up to 2 mms. All of the Xylan and Xylar pretreatments can be obtained from Whitford Plastics Limited.

Curing regimes other than those adapted above could be adopted. Xylan in typical formulations cures over a time/temperature range from 30 minutes at 100° C. to 5 minutes at 400° C. Formulations which cure at ambient temperatures are also available. The preferred formulation Xylan 1270 cures in 30 minutes at 180° C. and in 5 minutes at 260° C. and in times between 5 and 30 minutes at temperatures between 260 C. and 180 C.

Xylan formulations have operating temperature ranges from −195 C. to 285 C. Xylan 1270 can operate in the range −50 C. to 200 C.

Whilst above Xylan is sprayed on one or more components, Xylan could be applied by a variety of methods, including bulk deposition, manual painting, roller coating and electrodeposition.

Whilst above the Xylan is coated to a depth in the range of 10 microns to 30, a more preferred range is 15 to 25 microns. Xylan 1270 requires only one coat at a depth of 15 to 25 microns. However, other formulations of Xylan will require several coats.

Any of the following formulations of Xylan can be in one coat applied to a depth of 15 to 25 microns: Xylan 1010 (cure temperatures 205° C.–260° C. for times in the range 30 minutes to 3 minutes); Xylan 1014 (cure temperature 205° C.–260° C. for times in the range 30 minutes to 5 minutes); Xylan 1070 (cure temperatures 180° C.–280° C. for times in the range 30 minutes to 5 minutes); Xylan 1514 (cure temperatures 220° C.–250° C. for times in the range 30 minutes to 10 minutes).

The pre-coating of cast aluminium components with Xylan was found to have particularly good results in subsequent bonding using epoxy adhesives.

The method of bonding of the present invention is preferably used to form a plurality of bonds between a plurality of components which together form a vehicle structure (e.g.a bracket, a chassis and/or a body of a vehicle). For instance, the method could be used to join extruded elongate struts together, to join a transmission tunnel of carbon and/or glass fibres set in an epoxy resin to adjoining aluminium panels, to join steel engine mounting components to aluminium chassis components, to join composite body panels to aluminium chassis components or to join composite body panels together. The method is beneficially applied to spacers and workers.

What is claimed is:

1. A method of bonding together first and second components with an adhesive in which a coating comprising polytetrafluoroethylene in particulate form combined with polyimide-type binders, hard fillers and pigments is applied to a surface of at least one of the components and then the adhesive is used to bond the first and second components together with the adhesive adhering to the coating comprising polytetrafluoroethylene in particulate form combined with polyimide-type binders, hard fillers and pigments.

2. A method as claimed in claim 1 wherein the coating comprising polytetrafluoroethylene in particulate form combined with polyimide-type binders, hard fillers and pigments is applied to the surface of the component and then cured.

3. A method as claimed in claim 2 wherein the component coated with the coating comprising polytetrafluoroethylene in particulate form combined with polyimide-type binders, hard fillers and pigments in particulate form is heated to aid curing.

4. A method as claimed in claim 1 wherein the adhesive used is an epoxy adhesive.

5. A method as claimed in claim 1 wherein the adhesive used is a polyurethane adhesive.

6. A method as claimed in claim 4 wherein the adhesive is heated in situ between the first and second components to cure the adhesive.

7. A method as claimed in claim 1 wherein the first component is a cast aluminium component.

8. A method as claimed in claim 7 wherein the second component is an extruded aluminium component.

9. A method as claimed in claim 7 wherein the second component is a steel component.

10. A method as claimed in claim 7 wherein the second component is a composite material component.

11. A method as claimed in claim 1 wherein the first component is an extruded aluminium component.

12. A method as claimed in claim 11 wherein the second component is an extruded aluminium component.

13. A method as claimed in claim 11 wherein the second component is a steel component.

14. A method as claimed in claim 11 wherein the second component is a composite component.

15. A method as claimed in claim 1 wherein the first component is a steel component.

16. A method as claimed in claim 15 wherein the second component is a steel component.

17. A method as claimed in claim 15 wherein the second component is a composite component.

18. A method as claimed in claim 1 wherein the first component is a composite component.

19. A method as claimed in claim 18 wherein the second component is a composite component.

20. A method as claimed in claim 1 wherein the coating comprising polytetrafluoroethylene in particulate form combined with polyimide-type binders, hard fillers and pigments is applied to parts of the surfaces of both of the first and second components, said parts facing each other when the components are bonded together.

21. A method as claimed in claim 1 wherein the coating comprising polytetrafluoroethylene in particulate form combined with polyimide-type binders, hard fillers and pigments is cured before adhesive is applied over each surface coated with the coating comprising polytetrafluoroethylene in particulate form combined with polyimide-type binders, hard fillers and pigments.

22. A method as claimed in claim 1 wherein each surface to which the coating comprising polytetrafluoroethylene in particulate form combined with polyimide-type binders, hard fillers and pigments is applied is cleaned prior to the application of the coating comprising polytetrafluoroethylene in particulate form combined with polyimide-type binders, hard fillers and pigments.

23. A method as claimed in claim 22 wherein each surface is cleaned by an organic solvent.

24. A method as claimed in claim 22 wherein each surface is cleaned by grit blasting.

25. A method as claimed in claim 22 wherein each surface is cleaned by vapour degreasing.

26. A method as claimed in claim 1 wherein the first and second components are mechanically clamped together whilst the adhesive therebetween is cured.

27. A method as claimed in claim 1 wherein the coating comprising polytetrafluoroethylene in particulate form combined with polyimide-type binders, hard fillers and pigments is applied as a surface coating with a depth in the range of 10 microns to 30 microns.

28. A method as claimed in claim 1 wherein the coating comprising polytetrafluoroethylene in particulate form combined with polyimide-type binders, hard fillers and pigments is cured at temperatures from 150 C to 260 C.

29. A method as claimed in claim 1 wherein the coating comprising polytetrafluoroethylene in particulate form combined with polyimide-type binders, hard fillers and pigments is cured for a duration of 5 minutes to 30 minutes.

30. A method as claimed in claim 1 wherein the coating comprising polytetrafluoroethylene in particulate form combined with polymide-type binders, hard fillers and pigments is cured in a two stage process, a first curing at a first lower temperature and a second curing at a second higher temperature.

31. A structure formed from component parts in which at least first and second component parts are bonded together with an adhesive and wherein a coating comprising polytetrafluoroethylene in particulate form combined with polyimide-type binders, hard fillers and pigments is used as a surface coating on at least one of the bonded components to improve the strength of the bond.

* * * * *